UNITED STATES PATENT OFFICE.

RICHARD TAGGESELL, OF BUFFALO, NEW YORK, ASSIGNOR TO JACOB F. SCHELLKOPF, JR., AND C. P. HUGO, OF SAME PLACE.

BLUE-BLACK AZO DYE AND PROCESS OF MAKING SAME.

SPECIFICATION forming part of Letters Patent No. 618,963, dated February 7, 1899.

Application filed July 9, 1898. Serial No. 685,488. (Specimens.)

*To all whom it may concern:*

Be it known that I, RICHARD TAGGESELL, a subject of the King of Saxony, residing at Buffalo, in the county of Erie and State of New York, have invented new and useful Improvements in Diazo Dyestuffs and Methods of Producing the Same, of which the following is a specification.

My invention relates to the production of new azo dyestuffs by combining one molecule of the diazo compound of one of the following monosulfo-acids—sulfanilic acid, metanilic acid, toluidin-monosulfo-acid—with one molecule of alphanaphthylamin, rediazotizing the resulting azo compound, and combining the diazo compound so obtained with one molecule of one of the hereinafter-mentioned amidonaphtholdisulfo-acids or their equivalents. The resulting products correspond with the formula:

R represents in this formula the radical of one of the monosulfo-acids above mentioned.

In practicing this invention I prefer to employ the amidonaphtholdisulfo-acid "H" which is obtained by heating diamidonaphthalenealphadisulfo-acid with mineral acids in an alkaline solution. Equivalent amidonaphtholdisulfo-acids which can be used in the same manner and produce substantially the same result are the following: that which is described in Letters Patent of the United States No. 458,286, dated August 25, 1891; that which is obtained by nitrating the naphthalenedisulfo-acids described by Ebert and Merz in *Berichte of the Deutsche Chemische Gesellschaft*, Vol IX, page 592, with two molecules of $HNO_3$, reducing the resulting dinitro product, and heating the resulting diamido product with strong mineral acids at about 150° centigrade in an alkaline solution; that which is described in Letters Patent of the United States No. 563,382, dated July 7, 1896, and identified in said patent as "K," and that which is identified as 1.8.5.7 in German Letters Patent No. 62,289, dated November 8, 1889.

In preparing these new dyestuffs according to my invention I proceed as follows, parts being parts by weight: One hundred and ninety-five parts of the sodium salt of sulfanilic acid are dissolved in water and diazotized by adding two hundred and fifty parts of hydrochloric acid of thirty-five per cent. and sixty-nine parts of sodium nitrite. To the resulting diazo compound a watery solution of 179.5 parts of hydrochloric alphanaphthylamin is added and the mixture is stirred for about ten hours. The azo compound so obtained is made alkaline by addition of a watery solution of eighty-five parts of caustic soda. To the resulting mixture I add three hundred parts of hydrochloric acid of thirty-five per cent. and ninety parts of sodium nitrite diluted in sufficient water, the temperature to be kept at about 30° centigrade. After stirring for about an hour the mixture is poured in a cold watery solution containing three hundred parts of carbonate of soda, to which have been added three hundred and eighty parts of either of the herein-described amidonaphtholdisulfo-acids. The dyestuff is formed immediately the mixture is brought to a boil, and the dyestuff separated by the addition of common salt, filtered, pressed, dried, and pulverized. The resulting dyestuff is a dark powder which is easily soluble in water. In concentrated sulfuric acid it dissolves with a green color. On addition of sulfuric acid to the watery solution the dyestuff separates in blue flakes. It dyes wool in an acid-bath bluish-black shades of great fastness to washing and against the action of light.

I claim as my invention—

1. The method of producing azo dyestuffs which consists in combining one molecule of the diazo derivative of one of the herein-described monosulfo-acids of the benzene series with one molecule of alphanaphthylamin, rediazotizing the intermediate product so obtained, and combining the latter with one of the herein-described amidonaphtholdisulfo-acids, substantially as described.

2. The method of producing azo dyestuffs which consists in combining one molecule of the diazo derivative of one of the herein-described monosulfo-acids of the benzene series with one molecule of alphanaphthylamin, rediazotizing the intermediate product so obtained, and combining the latter with amidonaphtholdisulfo-acid "H," substantially as set forth.

3. The herein-described new azo dyestuff derived from the diazo derivative of one of the herein-described monosulfo-acids of the benzene series, alphanaphthylamin and one of the herein-described amidonaphtholdisulfo-acids, said dyestuff being a dark powder, easily soluble in water in which it dissolves with a blue color and in concentrated sulfuric acid with a green color and dyeing wool in an acid-bath bluish-black shades of great fastness, substantially as set forth.

4. The herein-described new azo dyestuff derived from the diazo derivative of one of the herein-described monosulfo-acids of the benzene series, alphanaphthylamin and amidonaphtholdisulfo-acid "H," said dyestuff being a dark powder, easily soluble in water in which it dissolves with a blue color and in concentrated sulfuric acid with a green color and dyeing wool in an acid-bath bluish-black shades of great fastness, substantially as described.

Witness my hand this 1st day of July, 1898.

RICHARD TAGGESELL.

Witnesses:
EDWARD WILHELM,
CARL F. GEYER.

It is hereby certified that the names of the assignees in Letters Patent No. 618,963, granted February 7, 1899, upon the application of Richard Taggeswell, of Buffalo, New York, for an improvement in "Blue-Black Azo Dyes and Processes of Making Same," were erroneously written and printed "Jacob F. Schellkopf, Jr., and C. P. Hugo," whereas said names should have been written and printed *Jacob F. Schoellkopf, Jr., and C. P. Hugo Schoellkopf;* and that the said Letters Patent should be read with these corrections therein that the same may conform to the record of the case in the Patent Office.

Signed, countersigned, and sealed this 21st day of February, A. D., 1899.

[SEAL.]
WEBSTER DAVIS,
*Assistant Secretary of the Interior.*

Countersigned:
C. H. DUELL,
*Commissioner of Patents.*